(12) United States Patent
Whikehart et al.

(10) Patent No.: US 11,285,966 B2
(45) Date of Patent: Mar. 29, 2022

(54) METHOD AND SYSTEM FOR CONTROLLING AN AUTONOMOUS VEHICLE RESPONSE TO A FAULT CONDITION

(71) Applicant: VISTEON GLOBAL TECHNOLOGIES, INC., Van Buren Township, MI (US)

(72) Inventors: John William Whikehart, Northville, MI (US); Michael K. Ingrody, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 345 days.

(21) Appl. No.: 16/424,960

(22) Filed: May 29, 2019

(65) Prior Publication Data
US 2020/0377113 A1  Dec. 3, 2020

(51) Int. Cl.
*B60W 50/14* (2020.01)
*G07C 5/02* (2006.01)
*G07C 5/08* (2006.01)
*G06Q 40/08* (2012.01)
*B60Q 9/00* (2006.01)

(52) U.S. Cl.
CPC ............... *B60W 50/14* (2013.01); *B60Q 9/00* (2013.01); *G06Q 40/08* (2013.01); *G07C 5/02* (2013.01); *G07C 5/08* (2013.01); *B60W 2050/146* (2013.01); *B60W 2400/00* (2013.01); *B60W 2556/00* (2020.02)

(58) Field of Classification Search
CPC ............ B60W 50/14; B60W 2556/00; B60W 2050/146; B60W 2400/00; B60Q 9/00; G06Q 40/08; G07C 5/02; G07C 5/08
See application file for complete search history.

(56) References Cited

U.S. PATENT DOCUMENTS

| | | | | |
|---|---|---|---|---|
| 6,198,996 | B1 * | 3/2001 | Berstis | H04L 63/105 701/36 |
| 8,732,516 | B2 * | 5/2014 | Adams, Jr. | H04L 43/50 714/4.1 |
| 11,037,177 | B1 * | 6/2021 | Chan | G06Q 40/025 |
| 2004/0158367 | A1 * | 8/2004 | Basu | G07C 5/006 701/31.9 |
| 2013/0342336 | A1 * | 12/2013 | Kiefer | G08G 1/163 340/436 |
| 2016/0303969 | A1 * | 10/2016 | Akula | A61B 5/7475 |
| 2017/0101054 | A1 * | 4/2017 | Dusane | G08G 1/205 |
| 2018/0201187 | A1 * | 7/2018 | Yellambalase | B60L 3/0023 |
| 2019/0202467 | A1 * | 7/2019 | Sun | B60W 50/082 |

* cited by examiner

*Primary Examiner* — Ramsey Refai
(74) *Attorney, Agent, or Firm* — Quinn IP Law

(57) ABSTRACT

An apparatus for an autonomous vehicle may include a controller. The controller may monitor one or more components or systems of the autonomous vehicle. The controller may determine a fault condition of the autonomous vehicle, such as for a component or a system of the autonomous vehicle. The apparatus may include a human-machine interface for a user, such as an occupant of the autonomous vehicle. The apparatus may communicate, via the human-machine interface, an alert based on the fault condition. This may be in accordance with a profile associated with the user.

19 Claims, 6 Drawing Sheets

METHOD AND SYSTEM FOR CONTROLLING AN AUTONOMOUS VEHICLE RESPONSE TO A FAULT CONDITION

FIELD

This disclosure relates to systems and methods for autonomous vehicles.

RELATED ART

From time to time vehicles require maintenance or other service. Furthermore, vehicles typically require refueling or recharging, depending on their energy sources.

Additionally, specific faults may occur within a vehicle. In certain cases, vehicles have indicated such faults through dashboard displays, such as "check engine" lights, and/or similar devices. Likewise, certain vehicles may indicate a current fuel or energy level and may provide a "low fuel" warning or the like when the level is critical.

As vehicles become increasingly autonomous, typical user familiarity with vehicle systems may decrease. At the same time, vehicle system complexity may increase with more systems and more possible fault conditions.

The occurrence of an unexpected event, such as a collision or other accident, may further complicate the user experience of an occupant of an autonomous vehicle. These and other scenarios, which are challenging in manually controlled vehicles, may be even more complex with autonomous vehicles.

SUMMARY

This disclosure relates generally to autonomous vehicle systems and methods.

An aspect of the disclosed embodiments is an apparatus that includes a controller configured to determine a fault condition of an autonomous vehicle. The apparatus may also include a human-machine interface configured to communicate an alert based on the fault condition to an occupant of the autonomous vehicle in accordance with a profile associated with the occupant.

Another aspect of the disclosed embodiments is a method that includes determining a fault condition of an autonomous vehicle. The method may also include communicating an alert based on the fault condition to an occupant of the autonomous vehicle in accordance with a profile associated with the occupant.

Another aspect of the disclosed embodiments is a non-transitory computer-readable medium that, in certain embodiments, is encoded with instructions that, when executed in hardware, perform a process. The process may include determining a fault condition of an autonomous vehicle. The process may also include communicating an alert based on the fault condition to an occupant of the autonomous vehicle in accordance with a profile associated with the occupant.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. The various features of the drawings are not to scale. On the contrary, the dimensions of the various features are arbitrarily expanded or reduced for clarity.

DETAILED DESCRIPTION

Figure 1:
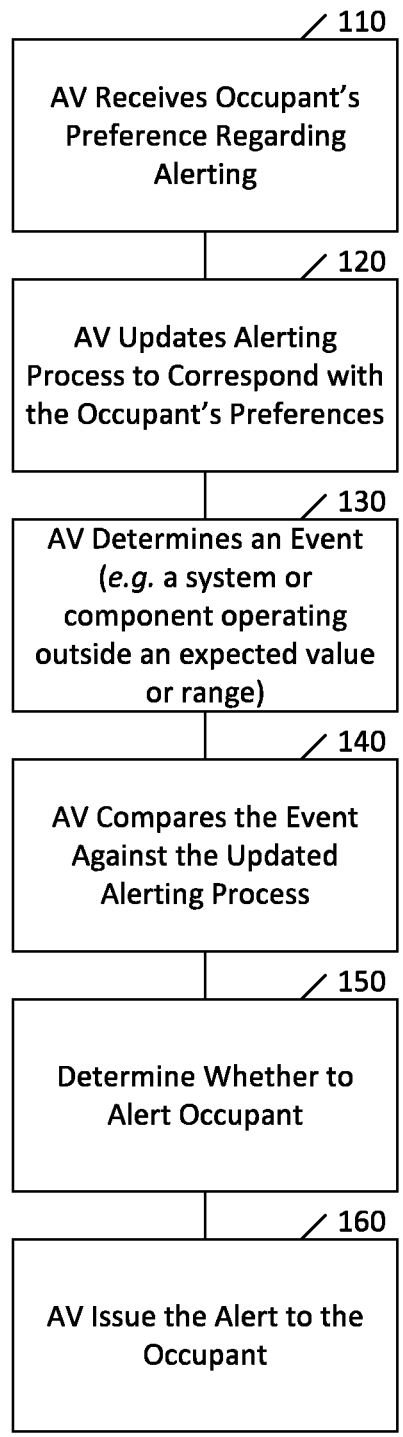
FIG. 1 generally illustrates a health flowchart of a vehicle-implemented method according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

One or more embodiments address how an autonomous vehicle (AV) may convey health information to an occupant, such as information regarding the health of the AV. If an occupant wants to know how a system on the AV is performing, one or more embodiments may provide a way for the AV to convey this information.

As mentioned above, some vehicle occupants or users may simply be riders with a minimal knowledge of AVs. On the other hand, other occupants may be quite knowledgeable about AVs. For example, some occupants may own their autonomous vehicles, while other occupants may be ride sharing. Furthermore, some owners or other occupants may take greater interest in tweaking the performance or other characteristics of the AV.

Thus, for example, one occupant may want the AV to provide detailed information regarding the AV's health, whereas another may not. In the event of a fault condition, the AV may need to determine whether or not to convey the fault condition to the occupant.

The AV may, in one or more embodiments, customize a level of notifications to avoid becoming annoying to an occupant and/or to increase a trust level with the occupant.

For example, an occupant of an AV may set a user profile that tailors what type of alerts to convey to the occupant. This tailoring may be based on any of the following categories: system type, severity, navigational events, timing, or other factors. System type as a category may refer to a system related to the alert. For example, infotainment alerts may be one category, while engine, fuel cell, or battery alerts may be another system, and light distance and ranging (LiDAR) or radar may be yet another system. Severity as a category may be used to allow an occupant to receive only critical alerts, critical and less critical alerts, or all alerts, including merely information alerts. Navigational events as a category may refer to reaching a destination, performing a change of roads, or passing a point of interest. Timing may refer to periodic alerts, such as an hourly update on fuel, energy, or other routine matters. Other factors as a category may include whether the occupant is a technician for servicing the AV.

In one or more embodiments, an occupant may configure a profile so that the system will only provide alerts on braking, powertrain, drivetrain, audio, video, LIDAR, and cameras. This may be a limitation on the provided alerts that is occupant-specific, group-specific, or universal. For example, the occupant may set a personal profile, a group profile (for example, for all ride share rideres), or a universal profile for all occupants of the vehicle.

Another example of a profile may be a profile that configures the system to provide only severe alerts that affect drivability of the AV. Another example may be a profile that configures the system to provide any fault condition alert regardless of severity. Yet another example may be a profile that configures the system to provide an alert on operation every X miles or Y minutes. This approach may be viewed as a town-crier approach. An example alert in this form might be: "We have travelled 10 miles, and all is well."

The AV may have a default list of alerts to provide to an occupant. Before or at the beginning of a ride, the AV may ask the occupant whether to deviate from the default list.

If this is the occupant's first time in the AV (or the first time using a system associated with the AV), then the AV may ask whether the occupant wants to save the occupant's responses to the default list for future rides. If so, the occupant may avoid having to address the default list each time the occupant goes on a ride. The occupant's preferences may be stored in the system associated with the AV (and others). If stored, the AV may inquire whether the occupant would like to make any changes or review stored preferences.

In providing an alert, the AV may utilize visual, haptic, and/or audible alerts. The alerts may be provided in different colors and font sizes, at different intensity or frequency levels, and at different volumes. For example, if an alert is highly critical, large text with red color and flashing background may be used in combination with heavy, frequent vibrations, and a loud audible alert to attract the attention of the occupant rapidly.

The AV may have set values or ranges for operation of components or systems. If operation is within the values or ranges, then the AV may remain silent. Alternatively, the AV may choose periodic (time-based or distance-based or a combination thereof) re-enforcements that all is well.

The AV may visually convey that all is well, such as a graphic of the AV that uses a color to indicate all is well or a list that identifies components or systems and provides status information, which indicates all is well.

If the AV determines that a component is operating outside of a set value or range for that component, then the AV may issue an alert to an occupant. Alternatively the AV may review the component's out-of-bounds operation against the occupant's preferences or an internal AV checklist. If the component also falls outside of the occupant's preferences and the internal AV checklist, then the AV may remain silent. The AV may simply log the component's out-of-bounds operation, such as for historical purposes, which a technician may want to be able to review. If the out-of-bounds operation is within the occupant's preferences or the internal AV checklist, then the AV may alert the occupant. This may be an audible and/or visual alert. The AV may identify the component, indicate status, inform the occupant of the degree of impact to the ride, recommend a course of action, and inquire whether the occupant agrees or has any additional questions. Although this is described in terms of a component, the same principle may be applied for entire systems of a vehicle.

A human-machine interface (HMI) may display an icon that indicates a component or a system is operating outside of expected bounds. The occupant may be given the chance to ignore the icon, inquire further, monitor further, or the like. This icon display and associated options may be set as part of the user's preferences. Having access to such options in may improve the occupant's experience, for the occupant may be able to prevent hearing, feeling, or seeing alerts that the occupant does not care about. This way, the AV may avoid needlessly bombarding the occupant with alerts, especially interrupting alerts, that the occupant has no interest in reviewing.

The AV may provide an alert when a component or a system is coming on-line or going off-line. This may be in advance of such coming or going. This may be part of the start-up or shutdown processes. As part of the alert, the AV may indicate whether that coming or going will impact functionality or ride experience, whether this is normal course, or the like. The coming or going may be based on weather condition(s), timing condition(s), lighting condition(s), power condition(s), and so on.

FIG. 1 illustrates a health flowchart of a vehicle-implemented method according to one or more embodiments. As shown in FIG. 1, a method 100 may include an autonomous vehicle (AV) receiving, at 110, an occupant's preferences regarding alerting. These preferences may be received over the air from a user's personal electronic device, such as a smart phone or smart watch. These preferences may be downloaded from a remote server. As another option, the user may input these preferences into the AV through a human-machine interface (HMI) of the AV, for example manually through a touch screen or through spoken interactions.

As shown at 120, the AV may update an alerting process to correspond with the occupant's expressed or implied preferences. For example, if an occupant bypasses entry of specific preferences, the AV may interpret such bypassing as an indication that default preferences should be used. The default may be a manufacturer default, an average (mode or median) of other occupant preferences (averaged for the vehicle or a fleet of vehicles), or the most recent previous occupant's preferences.

At 130, the AV may determine that an event has occurred. The event may be a system or component operating outside an expected value or range. The event may also be another trigger, such as a geographic boundary crossing, timer elapsing, or cumulative distance threshold. Another event could be, for example, the addition or departure of a further occupant of the vehicle. For example, the door opening and closing could be an event, or detection of a new person in the vehicle could be an event.

At 140, the AV may compare the event against an updated alerting process, namely the process updated at 120 based on the input received at 110. Then, at 150, the AV may determine whether or not to alert the occupant based on the comparison. If not, then the process may revert to waiting for a new update of preferences or a new event. Otherwise, at 160, the AV may issue an alert to the occupant. The AV may refer to the updated alerting process to determine the type of alert to issue.

As with some of the embodiments discussed above, one or more embodiments may relate to how the AV communicates its own health information to an occupant, particularly in the non-limiting example of a post-accident report. Thus, in the context of some of the above-described embodiments, an accident (such as a collision) may be considered an event that possibly triggers an alert.

One or more embodiments may also address further or alternative situations. For example, one or more embodiments may address a situation that occurs when an AV loses a system and therefore loses functionality. This may be due to an accident, such as a collision with another vehicle, or due to other causes. Indeed, one or more embodiments may also or alternatively relate to addressing what happens when an AV is involved in an accident, whether or not the result is a failure of a system or component. In an example, due to an accident or some other cause, a sensor, such as a camera may fail. One or more embodiments may address this failure.

In one or more embodiments, the AV may assess a score for drivability. This score may be dynamically updated. For example, immediately after a collision, certain faults like a punctured fuel tank, may not be immediately apparent. Nevertheless, if the fuel level drops rapidly over the next 15 minutes, the AV may update a drivability score to reflect a possible fuel tank puncture. Other dynamic scoring options are also permitted.

Furthermore, in one or more embodiments, the AV or a remote server may assess a distance range associated with the scoring. For example, based on a predicted recharging, refueling, or other maintenance needed, the AV may be determined to have a useful range of X miles or Y minutes. Other characteristics may similarly be identified. For example, if the vehicle will be unable to travel in rainy weather or on steep inclines, an alert may be provided to the occupant.

The AV may also automatically search for and identify emergency points of interest. For example, the AV may identify whether any hospital or open clinic is nearby. The AV may provide an alert indicating that a given hospital is out of range but a clinic is within range. The AV may, in another instance, identify that the nearest open emergency medical provider is out of range. The AV may head toward that nearest open emergency medical provider but may also contact emergency service, such as an ambulance to arrange for an en route pickup of an occupant of the vehicle.

The AV may perform a health assessment of the AV, as described above. The AV may also perform a health assessment of an occupant of the AV. For example, the AV may use its camera(s) or other sensors to determine if an occupant has normal posture, gaze, and so on. The AV may use a human-machine interface to query the occupant regarding the occupant's health. The AV may use sensor(s) to monitor vitals of the occupant.

The AV may alert the occupant that a collision or other accident has occurred. The AV may also suggest some next steps, such as proceeding to obtain repairs, exchanging insurance information with the collided vehicle, or the like. If a next step is to take an occupant to an emergency medical facility, the AV may also make a determination about whether to wait for approval or simply proceed without waiting.

In addition to, or as an alternative to, presenting the alert and/or suggestion for next steps, the AV may make additional customization(s) of the HMI in view of the accident. For example, the HMI may bring health-related options to a main screen, even if they were previously available within menus.

The AV may use maps and/or sensors to determine whether there is a safe area nearby. This AV may then proceed immediately to this safe area. The AV may, for example, determine that the AV has only one operational wheel. Nevertheless, the AV may attempt to move itself out of lanes of travel using the one operational wheel in order to protect itself and its occupants from further collisions. Once the AV is in a safe place, the AV may power down. While moving to a safe place, the AV may contact an emergency responder. The AV may determine a safe place based on relative safety within a range of the AV. For example, if the AV may only travel a few feet, the AV may attempt to get to a shoulder of a highway. If the AV may travel a few miles, the AV may attempt to get to a service station, rest area, or other place of safety. The AV may, in this process, ignore previous instructions regarding a target destination or other point of interest.

The AV may also make a determination about whether it is safe to continue traveling with occupants. In some cases, it may not be safe. For example, if the AV determines that the windscreen is severely damaged, or airbags have already been deployed, the AV may determine that it is not safe to proceed with driving while occupied. Accordingly, the AV may inform the occupant(s) and may schedule pickup of the occupant(s) or present the occupant(s) with pickup options, such as a taxi or another autonomous vehicle. The AV may then wait with the occupant(s) until the pickup occurs. Thus, the AV may be able to provide heating or air conditioning to an occupant even if the AV is not safe to move. Moreover, the AV may provide a place of relative safety for the occupant(s) as compared with standing by the side of a road.

Figure 2:
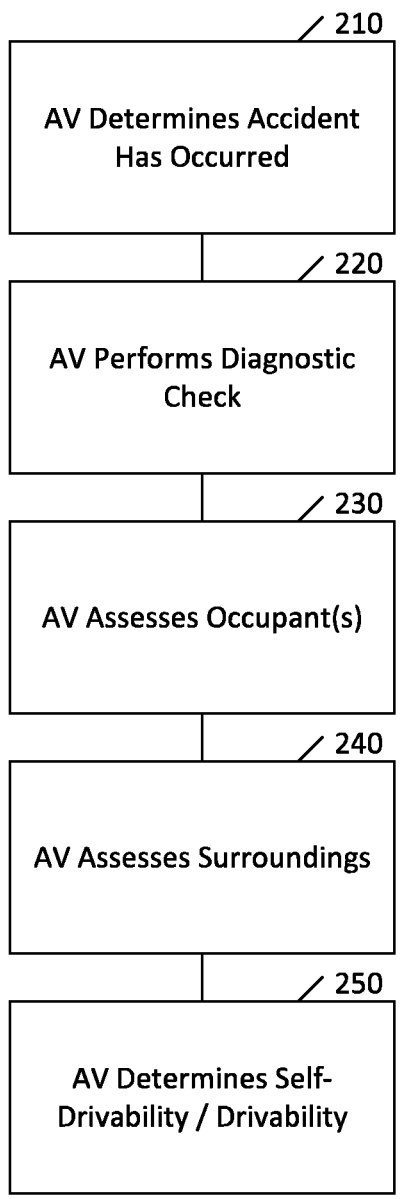
FIG. 2 generally illustrates a flowchart of a post-accident method for an autonomous vehicle, according to the principles of the present disclosure.

FIG. 2 illustrates a flowchart of a post-accident method for an autonomous vehicle, according to one or more embodiments. As shown in FIG. 2, a method 200 implemented in an autonomous vehicle (AV) and/or in a remote server may include, at 210, a determination that the AV has been in an accident. This may be a single-vehicle accident (for example, due to ice or a tree fall) or a multiple vehicle incident (for example, when the AV is hit by a manually driven vehicle). The detection of the accident may be performed using sensors on the AV, such as accelerometers or the like.

At 220, a diagnostic check of the AV may be performed. For example, a diagnostic electronic control unit (ECU) may run a check of other ECUs or each ECU may run its own diagnostic routines or both. The diagnostic check may involve determine characteristics of components and/or systems. For example, tire pressure may be checked, door open status may be checked, windshield integrity may be checked, fuel level may be checked, charge level may be checked, and wireless communication capability may be checked. If checking certain systems or components cannot be done within a few seconds, the AV may defer checking those systems or components until a later time.

At 230, the AV may assess occupant(s) of the vehicle as to the health, vitality, or the like. This is shown serially between performing a diagnostic check at 220 and assessing surroundings at 240. Nevertheless, these three checks may be performed in parallel or in a different order from shown. The AV may check the health of the occupant using health sensors including, for example, communicating with a smart watch or other health device of an occupant. The AV may also use facial monitoring cameras to check the faces of occupants. The AV may compare an image of a face of the occupant before the crash to a face of the occupant after the crash, to determine if the occupant appears to be injured.

At 240, the method 200 may include the AV assessing the AV's own surroundings. This may include object detection, communicating with other vehicles (for example, using vehicle to anything (V2X) or other communication protocols). The AV may use active sensors, such as LiDAR or radar, as well as passive sensors, such as cameras, to assess the surroundings. The AV may also use a global positioning system (GPS) to determine the location of the vehicle and may use map or other navigational data to determine expected surroundings of the vehicle.

At 250, the method 200 may also include determining self-drivability of the AV. For example, the AV or a remote server may assess whether the AV may drive itself, whether AV needs a human driver, and how far (either in terms of time or distance or a combination thereof) the AV is capable of driving. The determination may take into account road condition, including whether the road is obstructed by a crashed vehicle or other abnormal obstacle. The self-drivability assessment may also take into account whether at least a minimal set of components and/or systems is in adequate condition to safely perform self-driving.

An AV may include one or more sensors that indicate that the AV has been involved in an accident. This may include an impact sensor that analyzes force over time, a camera that analyzes object proximity, a LIDAR system that analyzes object proximity, an acoustic system that analyzes sound over time, a safety sensor that monitors deployment of a safety device, like an airbag, and many more.

The AV may determine that the AV's route has experienced an interruption. The AV may run a diagnostic check, which may include trying to shutdown and reboot a system to assess the interruption. The AV may prioritize the check based on criticality of a system. For example, a system that is associated with drivability may receive priority over a user experience/comfort system, like heating, ventilation, and air conditioning (HVAC). The AV may generate a score as to whether the AV is drivable. The AV may further calculate a range for drivability.

Additionally, the AV may assess an occupant's health, such as consciousness, alertness, pulse, and signs (including sounds) of panic.

The AV may search for a safe area. The AV may assess whether it is possible to drive to the safe area. The AV may propose driving to the safe area to the occupant. The AV may drive to the safe area in the absence of any objections from the occupant. Before leaving the scene of the accident, the AV may contact law enforcement and/or other emergency responders. The AV may also attempt to determine if any occupants were ejected from the AV, prior to leaving the accident location. If ejected occupants are detected, the AV may stay and attempt to protect the ejected occupant, for example by sounding the horn and flashing the lights of the AV and by placing the AV between any threats (such as oncoming traffic) and the ejected occupant. Similarly, the AV may use enhanced thresholds to improve potential detection of prone humans on a driving surface near the accident scene.

In one or more embodiments, if the AV determines that the AV is blocking a lane of traffic, and the AV notices a nearby open shoulder, the AV may determine whether to pull over to the open shoulder. Similarly, if the AV determines that the AV is blocking two lanes of traffic, the AV may move to block only a single lane.

The AV may exchange insurance and other information with another vehicle/person involved in the accident. This may be done through a V2X communication or through a human-machine interface including a display and/or speakers.

The AV may assess other vehicles/persons involved in, or witnesses of, the accident. The AV may try to capture images, take video, record audio, or the like. The AV may also request similar information from other vehicles, devices, and/or people in the area. The AV may save accident-related data onboard and/or send the data to a remote server. The AV may call emergency services and/or provide recorded or real-time data to the emergency services. The AV may provide assessments, such as of its drivability, its occupant's health, other vehicles, other persons, and the like. These reporting and recording features may be considered part of the self-reporting features of the AV.

The AV may also contact an appropriate agency if an animal, such as a deer or a dog, is involved in the accident. For example, the AV may contact animal control or wildlife services.

The AV may automatically activate emergency lights onboard and/or broadcast to surrounding vehicles and/or infrastructure, such as traffic signals, lane controls, and the like.

The AV may re-route to a hospital/medical center, a service station, or the like, as needed. If the AV determines that the destination is a possibility, the AV may propose carrying on to the occupant after relevant post-crash events have occurred. Alternatively, the AV may propose having another AV come pick up the occupant. The AV itself or in coordination with a remote server may make the necessary arrangements.

When a system unexpectedly goes off-line (or a component thereof), the AV may perform similar assessments. For example, the AV may determine what is the drivability of the AV, is the destination of the AV still reachable, should the AV re-route to a new destination or by a new path, what does the occupant want to do, and so on.

The AV may include an override routine in the event of an accident. Post-accident, the occupant(s) may be confused, worried, etc. The AV may provide feedback to the occupant(s), such as regarding the diagnostic check and determinations related thereto.

Figure 3:
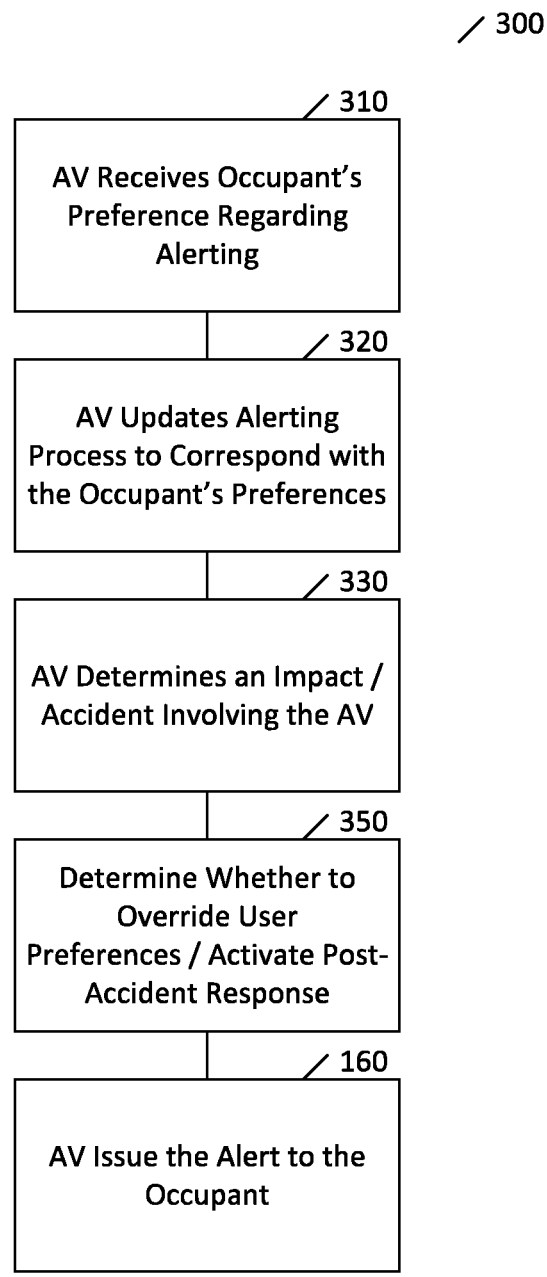
FIG. 3 generally illustrates a flowchart of a vehicle-implemented method in a post-accident scenario according to the principles of the present disclosure.

FIG. 3 illustrates a health flowchart of a vehicle-implemented method in a post-accident scenario according to one or more embodiments. FIG. 3 may be viewed as a variant of the approach shown in FIG. 1, although FIG. 3 can also stand independently, if desired.

At 310 (similar to 110 in FIG. 1), the AV may receive occupant's preference(s) regarding alerting. Then, at 320 (similar to 120 in FIG. 1), the AV may update the alerting process to correspond with the occupant's preferences. At 330, the AV may determine that an impact and/or accident has happened to the AV.

At 350, the AV may determine whether to override user preferences and/or activate a post-accident response. The user preferences may be detailed enough to include post-accident responses. In this case, the AV may simply implement the appropriate user preferences. In other cases, the AV may override the updated alerting process (and/or other user preferences) and instead proceed according to an emergency configuration. The AV therefore may, at 360 (similar to 160 in FIG. 1), issue an alert to the occupant. The alert may indicate that an emergency configuration is in use. The alert may further identify one or more changes that have occurred because of the override, such as if a new destination has been selected.

There may be various embodiments. For example, a method may include a variety of processes and procedures. The method may be implemented by an autonomous vehicle, systems, and/or components thereof, possibly in coordination with one or more remote server. The method may include determining a fault condition of an autonomous vehicle. The method may also include communicating an alert based on the fault condition to an occupant of the autonomous vehicle in accordance with a profile associated with the occupant. The communicating may include providing communication using audio, visual, haptic, or any combination thereof.

The method may further include setting up the profile with the occupant based on explicit interactions with the occupant. The setting up the profile may be configured to occur upon detection of a first time visit by the occupant within the autonomous vehicle or with a fleet of autonomous vehicles including the autonomous vehicle. The setting up may be configured to be triggered upon a first occurrence of the fault condition for the occupant.

The profile of the occupant and/or AV may be configured to tailor the alert according to severity of the fault condition, location of the autonomous vehicle, speed of the autonomous vehicle, autonomous mode of the autonomous vehicle, service mode of the autonomous vehicle, or any combination thereof.

The profile may be configured to tailor the alert based on whether the occupant is a service technician for the autonomous vehicle. The profile may be configured to control whether alerts are issued based on the type of fault condition.

The profile may be configured to control a timing or periodicity of alerts. The profile may be configured to require an alert regarding negative status of fault conditions. The profile may be configured to limit alerts based on one or more predefined threshold for the fault condition.

The method may also include communicating a suggestion for further action to the occupant, wherein the suggestion comprises an action related to the health or safety of the occupant or the repair or maintenance of the autonomous vehicle.

The communicating the alert may include communicating the alert external to the autonomous vehicle. For example, the communicating may be done using one or more radio access technology, such as WiFi, ceullar, or V2X.

The method may further include determining whether the autonomous vehicle may provide shelter for occupant despite a disabling fault condition of the autonomous vehicle and communicating based on the determination.

The method may also further include determining a health or consciousness state of the occupant and communicating external to the vehicle based on the determination of the fault condition and the health or consciousness of the occupant.

Also, the method may include determining a new destination for the autonomous vehicle based on the fault condition and communicating the new destination to the occupant, controlling the autonomous vehicle to the destination, or any combination thereof. The determining may include searching for a safe area for the autonomous vehicle and the occupant.

The communicating may include exchanging insurance information with a nearby vehicle when the fault condition indicates that a collision has occurred. The method may also include determining whether the autonomous vehicle may continue to drive based on the fault condition. The communicating may include requesting or instructing another autonomous vehicle to pick up the occupant of the vehicle when the fault condition indicates that the autonomous vehicle cannot continue to drive.

Figure 4:
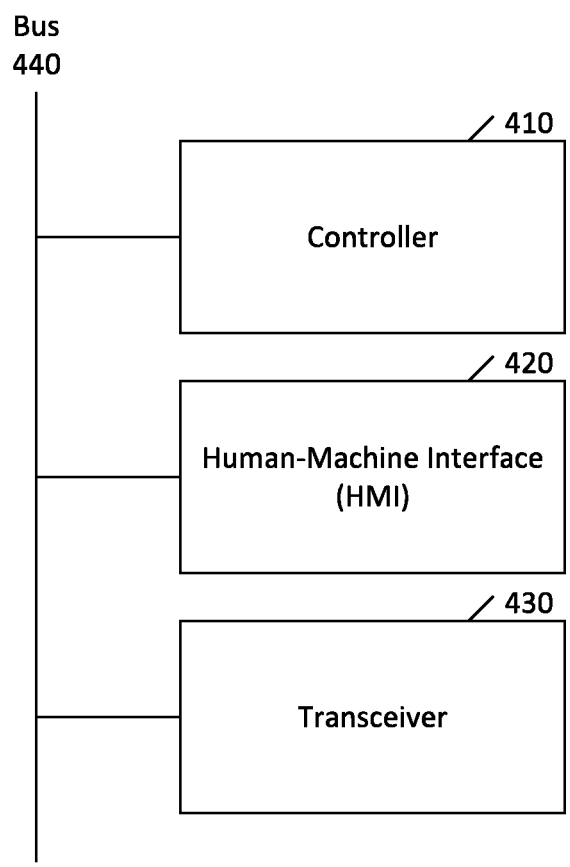
FIG. 4 generally illustrates an alerting system according to the principles of the present disclosure.

FIG. 4 illustrates a system according to one or more embodiments. The system shown in FIG. 4 may implement any of the above-described methods including, but not limited to, those methods illustrated in FIG. 1, FIG. 2, and FIG. 3.

As shown in FIG. 4, an apparatus may include a controller 410 configured to determine a fault condition of an autonomous vehicle. This may be a hardware processor with associated memory, such as a non-transitory computer-readable medium. The hardware processor may include one or many cores. The controller 410 may be the controller of an electronic control unit (ECU) of a vehicle, such as an autonomous vehicle.

The apparatus may also include a human-machine interface 420 configured to communicate an alert based on the fault condition to an occupant of the autonomous vehicle in accordance with a profile associated with the occupant. The human-machine interface 420 may be variously implemented. For example, audio, visual, and/or tactile technologies may be employed. If desired, the human-machine interface 420 may provide braille output to assist unsighted occupants of the vehicle. The human-machine interface 420 may include one or more speakers configured to play audio from a digital or analog source. The speakers may be configured to receive or synthesize sound data. For example, the speakers may receive input text and synthesize speech. Alternatively, speech synthesis may occur at the controller 410 or at another device, not shown.

The controller 410 may be configured to set up the profile with the occupant based on explicit interactions with the occupant. These explicit interactions may occur via the human-machine interface 420.

An additional or substitute human-machine interface (not shown) may be located on a device that is remote from and/or outside of the autonomous vehicle, such as on a smartphone, a computer in a call-center, or the like. There may be times where a service technician may need or prefer to be outside of the autonomous vehicle, but may still need to receive the alert on the HMI. There are other instances too, such as a parent wanting to receive alerts when a child is in the autonomous vehicle. This flexibility is permitted by one or more embodiments.

The setting up the profile may occur upon detection by the controller 410 of a first time visit by the occupant within the autonomous vehicle or with a fleet of autonomous vehicles including the autonomous vehicle. The setting up may be triggered upon a first occurrence of the fault condition for the occupant. Other setup scenarios are also permitted.

The profile may tailor the alert according to severity of the fault condition, location of the autonomous vehicle, speed of the autonomous vehicle, autonomous mode of the autonomous vehicle, service mode of the autonomous vehicle, or any combination thereof. Other tailoring options are also possible and permitted. For example, the profile may tailor the alert based on whether the occupant is a service technician for the autonomous vehicle.

Examples of autonomous modes may include full autonomous, partially autonomous, or fully manual. Partially autonomous mode may include control of following distance and lane keeping, but may not include other features, such as guidance to a target destination.

Examples of service modes may include whether the autonomous vehicle is serving as a vehicle for personal use, serving as a ride share vehicle, serving as a taxi, or driving without passengers (for example, to a charging area or other maintenance, depot, parking, or storage area).

The profile may control whether alerts are issued based on the type of fault condition. Other control or limitation is also permitted. For example, the profile may be configured to control a timing or periodicity of alerts. Moreover, the profile may be configured to require an alert regarding negative status of fault conditions. The profile may also be configured to limit alerts based on one or more predefined threshold for the fault condition.

The communicating may include providing communication via the human-machine interface 420 using audio through at least one speaker, visual through at least one display, haptic through at least one mechanical actuator, or any combination thereof.

The human-machine interface 420 may be further configured to communicate a suggestion for further action to the occupant. The suggestion may include an action related to the health or safety of the occupant or the repair or maintenance of the autonomous vehicle.

The communicating may include communicating the alert external to the autonomous vehicle using a transceiver 430.

The controller 410 may be further configured to determine whether the autonomous vehicle may provide shelter for occupant despite a disabling fault condition of the autonomous vehicle. The human-machine interface 420 may be configured to communicate based on the determination.

The controller 410 may be configured to determine a health or consciousness state of the occupant. Moreover, the transceiver 430 may be configured to communicate external to the vehicle based on the determination of the fault condition and the health or consciousness of the occupant.

The controller 410 may be configured to determine a new destination for the autonomous vehicle based on the fault condition. The human-machine interface 420 is configured to communicate the new destination to the occupant, controlling the autonomous vehicle to the destination, or any combination thereof. The determination may be based on searching for a safe area for the autonomous vehicle and the occupant.

The communicating may further include using the transceiver 430 to exchange insurance information with a nearby vehicle when the fault condition indicates that a collision has occurred.

The controller 410 may be further configured to determine whether the autonomous vehicle may continue to drive based on the fault condition.

The communicating may also include using the transceiver 430 to request or instruct another autonomous vehicle to pick up the occupant of the vehicle when the fault condition indicates that the autonomous vehicle cannot continue to drive.

Each of controller 410, HMI 420, and transceiver 430 may be interconnected with one another. One such possible interconnection is using bus 440. There can be multiple buses used, and other types of connection other than buses are also permitted.

Figure 5:
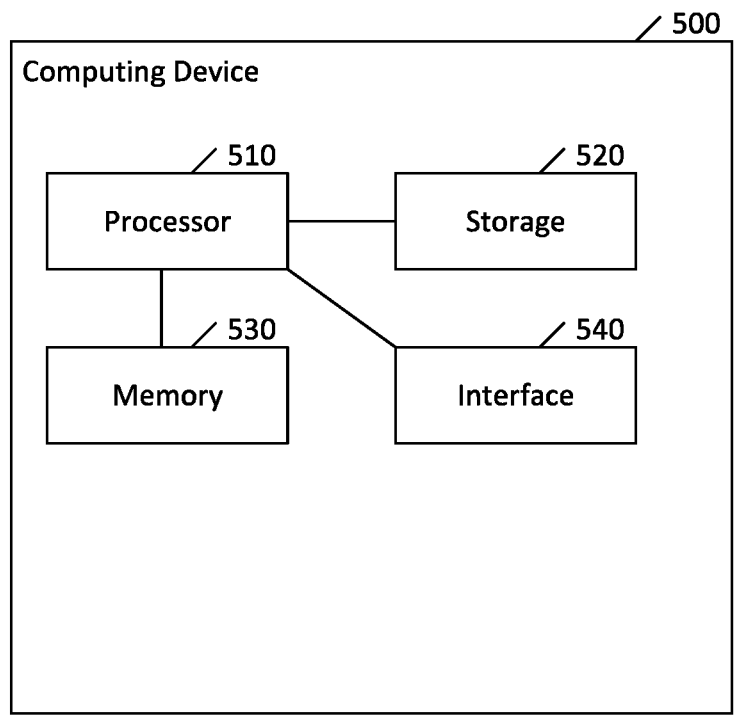
FIG. 5 generally illustrates a computing device according to one or more embodiments.

FIG. 5 generally illustrates a computing device according to one or more embodiments. Computing device 500 may be a controller, like controller 410 in FIG. 4 or any electronic control unit (ECU). Computing device 500 is illustrated as a single device with multiple internal components. Nevertheless, computing device 500 may alternatively be embodied in a distributed way or with portions of computing device 500 served remotely, via the Internet or a cloud server. Computing device 500 may include a hardware processor 510. Hardware processor 510 may include any computational hardware, such as one or more processing cores, an application specific integrated circuit (ASIC), a field programmable gate array (FPGA), or any other suitable hardware.

Computing device 500 may also include, in communication with the hardware processor 510, at least one storage device 520. Storage device 520 may be any suitable magnetic, optical, or quantum storage system. For example, storage device 520 may be a hard disk drive (HDD) or optical disk drive, such as a compact disk, read-only memory (CD-ROM).

Computing device 500 may also include, in communication with hardware processor 510, at least one memory 530. Memory 530 may be an form of computer-readable medium, such as any non-transitory computer-readable medium. Memory 530 may be on a same chip with hardware processor 510 or may be on a separate chip. Memory 530 may be any form of random access memory (RAM) or read only memory (ROM), such as flash memory, electrically erasable programmable ROM (EEPROM), dynamic random access memory (DRAM), or synchronous DRAM (SDRAM). In certain embodiments the memory 530 may be provided by or supplemented by the use of storage device 520. For example, storage device 520 may provide a lower speed memory cache while memory 530 may provide a high speed buffer for hardware processor 510. Many other options are possible and permitted.

Computing device 500 may also include interface 540, which may permit communication between computing device 500 and devices external to computing device 500. Interface 540 may include communications hardware, such as a network interface card (NIC), transceiver, or the like. Interface 540 may have its own memory and processor. Interface 540 may be configured to connect to a car area network (CAN), Ethernet network, WiFi network, vehicle to anything (V2X) network, or cellular network including, for example a third generation (3G), fourth generation (4G), or fifth generation (5G) cellular network. Other radio access technologies are also permitted.

Figure 6:
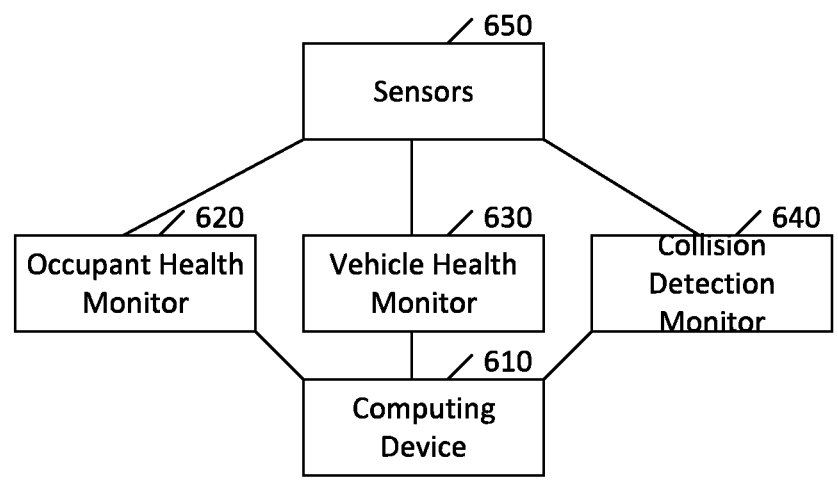
FIG. 6 generally illustrates an alerting system according to one or more embodiments.

FIG. 6 generally illustrates an alerting system according to one or more embodiments. Alerting system 600 may include a computing device 610, which may be similar to computing device 500 in FIG. 5. Altering system 600 may also include an occupant health monitor 620, a vehicle health monitor 630, and a collision detection monitor 630. Each of the occupant health monitor 620, the vehicle health monitor 630, and the collision detection monitor 630 may be constructed similar to computing device 500 in FIG. 5. The occupant health monitor 620 may be connected to devices that monitor the state of the vehicle occupant, for example, the health, welfare, position, and/or consciousness of the vehicle occupant. The devices to accomplish such monitoring may include a gaze monitoring device involving a visible light or infrared camera viewing the face of the occupant. The devices may also include microphones or other devices to observe the sound and other behaviors of the occupant. Pressure sensors in the vehicle seats may be used to determine posture and/or placement of the occupant. These and other sensors are shown as sensors 650 in FIG. 6.

Similarly, the vehicle health monitor 630 may be connected to various of sensors 650 including devices that monitor engine characteristics, motor characteristics, battery characteristics, tire pressure, and so on. Broadly speaking vehicle health monitor 630 may be connected to any sensors 650 within the vehicle. In one or more embodiments, vehicle health monitor 630 may be connected to a subset of the sensors 650 that have a direct impact on the drivability of the vehicle.

Collision detection monitor 640 may likewise be connected to a subset of sensors 650. Collision detection monitor 640 may, for example, be connected to one or more accelerometers distributed throughout the vehicle, which may identify when a collision has occurred. Collision detection monitor 640 may also be connected to an airbag deployment system, which may provide an output of whether an airbag has been deployed.

An apparatus in one or more embodiments may include a controller configured to determine a fault condition of an autonomous vehicle. The apparatus may also include a human-machine interface configured to communicate an alert based on the fault condition to an occupant of the autonomous vehicle in accordance with a profile associated with the occupant, wherein the controller is configured to apply the profile to control a way in which the fault condition is alerted within the autonomous vehicle.

The controller may be further configured to generate the profile based on input from the occupant. The controller may be configured to generate the profile upon detection of a first time visit by the occupant within the autonomous vehicle. As another alternative, the controller may be configured to generate the profile upon a first occurrence of the fault condition for the occupant.

The controller may be configured to, based on the profile, tailor the alert according to a severity of the fault condition, location of the autonomous vehicle, speed of the autonomous vehicle, autonomous mode of the autonomous vehicle, service mode of the autonomous vehicle, or any combination thereof.

The controller may be configured to, based on the profile, tailor the alert based on whether the occupant is a service technician for the autonomous vehicle.

The controller may be configured to, based on the profile, control whether alerts are issued based on a fault condition type of the fault condition. For example, certain fault condition types may yield an alert to certain profiles while not to other profiles.

The communicating the alert to an occupant may include providing communication via the human-machine interface using audio through at least one speaker, visual through at least one display, haptic through at least one mechanical actuator, or any combination thereof.

The controller may be configured to, based on the profile, control a timing or periodicity of alerts. The controller may be configured to, based on the profile, require alerting regarding negative status of fault conditions. For example, this may correspond to an "all is well" or "the vehicle is still drivable." A qualifier may accompany the report of negative status. The qualifier may indicate how many miles or hours the report remains valid or the status is expected to remain the same. For example, the "vehicle has enough charge for 100 more miles of travel."

The controller may be configured to, based on the profile, limit alerts based on one or more predefined threshold for the fault condition. For example, the profile may specify that the fault must have a minimum degree of severity or a minimum effect on drivability or safety, before the occupant is notified with an alert. In certain cases, when announcing negative status minor faults may be ignored so that the system may report "all is well," even when there are minor faults. As another option, the system may report "all is well, but there are Z minor faults," where Z is the number of minor faults.

The human-machine interface may be further configured to communicate a recommendation or other suggestion for further action to the occupant. The recommendation may identify an action related to state of the occupant or state of the autonomous vehicle.

The controller may be further configured to, in response to a disabling fault condition of the autonomous vehicle, determine whether the autonomous vehicle is capable to provide shelter for the occupant. The human-machine interface may be configured to communicate regarding providing the shelter based on the determination.

The controller may configured to determine a state of the occupant and to communicate external to the autonomous vehicle based on the determination of the fault condition and the state of the occupant. The state of the occupant may include the health of the occupant, the consciousness of the occupant, or the continued presence of the occupant within the vehicle.

The controller may be configured to override a current destination and determine a new destination for the autonomous vehicle based on the fault condition. The human-machine interface may be configured to communicate the new destination to the occupant, the controller may be configured to control the autonomous vehicle to the new destination, or any combination thereof may occur as a further action after the determination of the new destination.

The determining the new destination may include searching for a safe area for the autonomous vehicle and the occupant. The communicating performed by the autonomous vehicle may include comprises exchanging insurance information with a nearby vehicle when the fault condition indicates that a collision has occurred.

The controller may be further configured to determine whether the autonomous vehicle is capable to continue to drive based on the fault condition. The communicating by the autonomous vehicle may further include requesting or instructing another autonomous vehicle to pick up the occupant of the autonomous vehicle when the fault condition indicates that the autonomous vehicle cannot continue to drive.

Other implementations are also possible. In the preceding discussion there was reference to autonomous vehicles. Nevertheless, the same principles may be applied to other vehicles that may not be classified as autonomous vehicles. Some autonomous vehicles to which one or more embodiments may be applied may be less than fully autonomous and may require a human driver for at least some operations.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

Various terms are used to refer to particular system components. In the above discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Controller" may refer to individual circuit components, an application-specific integrated circuit (ASIC), a microcontroller with controlling software, a digital signal processor (DSP), a processor with controlling software, a field programmable gate array (FPGA), or combinations thereof.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing, but not limited to, any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module. In some embodiments, the controller, as described herein, implemented within a host may be configured with hardware and/or firmware to perform the various functions described herein.

Further, in one aspect, for example, systems described herein may be implemented using a general-purpose computer or general-purpose processor with a computer program that, when executed, carries out any of the respective methods, algorithms, and/or instructions described herein. In addition, or alternatively, for example, a special purpose computer/processor may be utilized which may contain other hardware for carrying out any of the methods, algorithms, or instructions described herein.

Further, all or a portion of implementations of the present disclosure may take the form of a computer program product accessible from, for example, a computer-usable or computer-readable medium. A computer-usable or computer-readable medium (for example, a non-transitory computer-readable medium) may be any device that is able to, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for an autonomous vehicle, the apparatus comprising:
   a controller configured to determine a fault condition of the autonomous vehicle;
   a human-machine interface configured to communicate an alert based on the fault condition to an occupant of the autonomous vehicle in accordance with a profile associated with the occupant, wherein the controller is configured to apply the profile to control a way in which the fault condition is alerted within the autonomous vehicle;
   wherein the controller is configured to override a current destination and determine a new destination for the autonomous vehicle based on the fault condition; and
   wherein the controller is configured to communicate using the human-machine interface the new destination to the occupant, controlling the autonomous vehicle to the new destination, or any combination thereof.

2. The apparatus of claim 1, wherein the controller is further configured to generate the profile based on input from the occupant.

3. The apparatus of claim 2, wherein the controller is configured to generate the profile upon detection of a first time visit by the occupant within the autonomous vehicle.

4. The apparatus of claim 2, wherein the controller is configured to generate the profile upon a first occurrence of the fault condition for the occupant.

5. The apparatus of claim 1, wherein the controller is configured to, based on the profile, tailor the alert according to a severity of the fault condition, location of the autonomous vehicle, speed of the autonomous vehicle, autonomous mode of the autonomous vehicle, service mode of the autonomous vehicle, or any combination thereof.

6. The apparatus of claim 1, wherein the controller is configured to, based on the profile, tailor the alert based on whether the occupant is a service technician for the autonomous vehicle.

7. The apparatus of claim 1, wherein the controller is configured to, based on the profile, control whether alerts are issued based on a fault condition type of the fault condition.

8. The apparatus of claim 1, wherein the communicating comprises providing communication via the human-machine interface using audio through at least one speaker, visual through at least one display, haptic through at least one mechanical actuator, or any combination thereof.

9. The apparatus of claim 1, wherein the controller is configured to, based on the profile, control a timing or periodicity of alerts.

10. The apparatus of claim 1, wherein the controller is configured to, based on the profile, require alerting regarding negative status of fault conditions.

11. The apparatus of claim 1, wherein the controller is configured to, based on the profile, limit alerts based on one or more predefined threshold for the fault condition.

12. The apparatus of claim 1, wherein the human-machine interface is further configured to communicate a recommendation for further action to the occupant, wherein the recommendation comprises an action related to state of the occupant or state of the autonomous vehicle.

13. The apparatus of claim 1, wherein, in response to a disabling fault condition of the autonomous vehicle, the controller is further configured to determine whether the autonomous vehicle is capable to provide shelter for the occupant, and wherein the human-machine interface is configured to communicate regarding providing the shelter based on the determination.

14. The apparatus of claim 1, wherein the controller is configured to determine a status of the occupant and to communicate external to the autonomous vehicle based on the determination of the fault condition and the state of the occupant.

15. The apparatus of claim 1, wherein the determining the new destination comprises searching for a safe area for the autonomous vehicle and the occupant.

16. The apparatus of claim 1, wherein the communicating further comprises exchanging insurance information with a nearby vehicle when the fault condition indicates that a collision has occurred.

17. The apparatus of claim 1, wherein the controller is further configured to determine whether the autonomous vehicle is capable to continue to drive based on the fault condition.

18. The apparatus of claim 1, wherein the communicating further comprises requesting or instructing another autonomous vehicle to pick up the occupant of the autonomous vehicle when the fault condition indicates that the autonomous vehicle cannot continue to drive.

19. A non-transitory computer-readable medium encoded with instructions that, when executed in hardware, perform a process, the process comprising:
   determining a fault condition of an autonomous vehicle;
   communicating an alert based on the fault condition to an occupant of the autonomous vehicle in accordance with a profile associated with the occupant wherein the profile specifies a way in which the fault condition is alerted within the autonomous vehicle;
   overriding a current destination and determine a new destination for the autonomous vehicle based on the fault condition; and
   communicating the new destination to the occupant, controlling the autonomous vehicle to the new destination, or any combination thereof.

* * * * *